(12) United States Patent
Diebold

(10) Patent No.: US 9,120,074 B2
(45) Date of Patent: Sep. 1, 2015

(54) LAMINATE PAPER TREATED WITH INORGANIC PIGMENTS HAVING IMPROVED DISPERSABILITY

(71) Applicant: E I DU PONT DE NEMOURS AND COMPANY, Wilmington, DE (US)

(72) Inventor: Michael Patrick Diebold, Wilmington, DE (US)

(73) Assignee: THE CHEMOURS COMPANY TT, LLC, Harrisburg, PA (US)

( * ) Notice: Subject to any disclaimer, the term of this patent is extended or adjusted under 35 U.S.C. 154(b) by 0 days.

(21) Appl. No.: 14/354,408

(22) PCT Filed: Oct. 11, 2012

(86) PCT No.: PCT/US2012/059773
§ 371 (c)(1),
(2) Date: Apr. 25, 2014

(87) PCT Pub. No.: WO2013/062783
PCT Pub. Date: May 2, 2013

(65) Prior Publication Data
US 2014/0338852 A1    Nov. 20, 2014

Related U.S. Application Data

(60) Provisional application No. 61/552,725, filed on Oct. 28, 2011.

(51) Int. Cl.
| | |
|---|---|
| *D21H 17/69* | (2006.01) |
| *D21H 19/38* | (2006.01) |
| *D21H 17/51* | (2006.01) |
| *D21H 17/68* | (2006.01) |
| *D21H 27/30* | (2006.01) |
| *C09C 1/00* | (2006.01) |
| *C09C 1/36* | (2006.01) |
| *C08K 9/02* | (2006.01) |
| *C08K 9/06* | (2006.01) |
| *B01J 13/02* | (2006.01) |
| *C09C 3/06* | (2006.01) |
| *C09C 1/02* | (2006.01) |
| *B82Y 30/00* | (2011.01) |
| *B01J 13/22* | (2006.01) |
| *D21H 17/46* | (2006.01) |
| *D21H 17/56* | (2006.01) |

(52) U.S. Cl.
CPC ............... *B01J 13/025* (2013.01); *B01J 13/22* (2013.01); *B82Y 30/00* (2013.01); *C09C 1/027* (2013.01); *C09C 1/3661* (2013.01); *C09C 3/063* (2013.01); *D21H 17/46* (2013.01); *D21H 17/56* (2013.01); *D21H 17/69* (2013.01); *D21H 19/38* (2013.01); *D21H 27/30* (2013.01); *C01P 2004/62* (2013.01); *C01P 2004/64* (2013.01); *C01P 2004/84* (2013.01); *C01P 2006/60* (2013.01)

(58) Field of Classification Search
CPC ...... C09C 1/3661; C09C 1/36; C09C 1/3684; C09C 1/0084; C09C 1/407; C08K 9/02; C08K 2003/2241; D21H 17/69; D21H 17/675; D21H 19/38; D21H 27/26; D21H 27/30; D21H 17/51; D21H 17/68; D21H 19/385; D21H 19/3851
USPC ........... 162/135–137, 123–133, 164.1, 164.6, 162/165–166, 168.2, 181.1–181.8; 428/172, 323, 329, 331, 411.1, 537.5
See application file for complete search history.

(56) References Cited

U.S. PATENT DOCUMENTS

| | | | | |
|---|---|---|---|---|
| 3,035,966 | A * | 5/1962 | Siuta .............................. | 162/166 |
| 3,409,501 | A * | 11/1968 | Siuta .............................. | 162/166 |
| 3,658,566 | A * | 4/1972 | Sheehan et al. ............... | 106/446 |
| 4,075,031 | A * | 2/1978 | Allen ............................. | 106/446 |
| RE30,233 | E * | 3/1980 | Lane et al. ..................... | 428/207 |
| 4,239,548 | A * | 12/1980 | Barnard et al. ............... | 106/439 |
| 4,461,810 | A * | 7/1984 | Jacobson ....................... | 428/530 |
| 4,599,124 | A * | 7/1986 | Kelly et al. ..................... | 156/71 |
| 4,689,102 | A * | 8/1987 | Prawdzik et al. ............. | 156/235 |
| 4,737,194 | A * | 4/1988 | Jacobson ....................... | 106/439 |
| 5,425,986 | A * | 6/1995 | Guyette ......................... | 428/141 |
| 5,554,216 | A * | 9/1996 | Baidins et al. ................ | 106/442 |
| 5,562,764 | A * | 10/1996 | Gonzalez ....................... | 106/437 |
| 5,679,219 | A * | 10/1997 | Harms et al. ................ | 162/164.1 |
| 5,696,109 | A * | 12/1997 | Malfroy-Camine et al. . | 514/185 |
| 5,993,533 | A * | 11/1999 | Diebold et al. ................ | 106/442 |
| 6,287,681 | B1 * | 9/2001 | Mehta et al. ................... | 428/323 |

(Continued)

FOREIGN PATENT DOCUMENTS

| | | | |
|---|---|---|---|
| ES | 2185243 | T3 * | 4/2003 |
| WO | WO 9640149 | A1 * | 12/1996 |

(Continued)

*Primary Examiner* — Jose Fortuna

(57) ABSTRACT

The disclosure provides a laminate paper comprising a treated inorganic core particle, in particular treated titanium dioxide ($TiO_2$) particle, having improved dispersability, prepared by a process comprising: (a) heating a slurry comprising porous silica treated inorganic core particle and water at a temperature of at least about 90° C.; and (b) adding a soluble alumina source to the slurry from step (a) while maintaining the pH at about 8.0 to 9.5 to form an alumina treatment on the porous silica treated inorganic core particle; wherein the treated inorganic core particle does not comprise dense silica or alumina treatments, and has silica present in the amount of about 7% to about 14% and alumina present in the amount of about 4.0% to about 8.0%; and wherein the particle to particle surface treatments are substantially homogeneous.

17 Claims, No Drawings

(56) References Cited

U.S. PATENT DOCUMENTS

| | | | |
|---|---|---|---|
| 6,290,815 B1 * | 9/2001 | Magnin et al. | 162/181.1 |
| 6,413,618 B1 * | 7/2002 | Parker et al. | 428/195.1 |
| 6,551,455 B2 * | 4/2003 | Johnson et al. | 162/128 |
| 6,706,372 B2 * | 3/2004 | Schulz et al. | 428/195.1 |
| 6,709,764 B1 * | 3/2004 | Perrin et al. | 428/537.5 |
| 6,783,631 B2 * | 8/2004 | Schulz | 162/181.1 |
| 7,029,648 B2 * | 4/2006 | Subramanian et al. | 423/613 |
| 8,888,956 B2 * | 11/2014 | Kraiter et al. | 162/164.6 |
| 2002/0182429 A1 * | 12/2002 | Yokochi et al. | 428/537.5 |
| 2003/0113520 A1 * | 6/2003 | Takahashi et al. | 428/201 |
| 2003/0138600 A1 * | 7/2003 | Dohring et al. | 428/143 |
| 2006/0275597 A1 * | 12/2006 | Thiele | 428/323 |
| 2013/0040130 A1 * | 2/2013 | Burniston et al. | 428/329 |
| 2014/0338852 A1 * | 11/2014 | Diebold | 162/164.6 |
| 2014/0342087 A1 * | 11/2014 | Diebold et al. | 427/213.31 |
| 2014/0343212 A1 * | 11/2014 | Diebold et al. | 524/437 |
| 2014/0363662 A1 * | 12/2014 | Chinn et al. | 428/328 |

FOREIGN PATENT DOCUMENTS

| | | |
|---|---|---|
| WO | WO 9748771 A1 * | 12/1997 |
| WO | WO 03010244 A2 * | 2/2003 |
| WO | WO 03037995 A1 * | 5/2003 |
| WO | WO 2012121801 A1 * | 9/2012 |
| WO | WO 2013062783 A1 * | 5/2013 |
| WO | WO 2014078050 A1 * | 5/2014 |

* cited by examiner

LAMINATE PAPER TREATED WITH INORGANIC PIGMENTS HAVING IMPROVED DISPERSABILITY

BACKGROUND OF THE DISCLOSURE

The present invention pertains to a laminate paper and paper laminate made from such paper. More specifically, the laminate paper comprises a treated inorganic core particle, in particular a treated titanium dioxide particle, having improved dispersability.

Paper laminates are in general well-known in the art, being suitable for a variety of uses including table and desk tops, countertops, wall panels, floor surfacing, tableware and the like. Paper laminates have such a wide variety of uses because they can be made to be extremely durable, and can be also made to resemble (both in appearance and texture) a wide variety of construction materials, including wood, stone, marble and tile, and can be decorated to carry images and colors.

Typically, the paper laminates are made from papers by impregnating the papers with resins of various kinds, assembling several layers of one or more types of laminate papers, and consolidating the assembly into a unitary core structure while converting the resin to a cured state. The type of resin and laminate paper used, and composition of the final assembly, are generally dictated by the end use of the laminate.

Decorative paper laminates can be made by utilizing a decorated paper layer as upper paper layer in the unitary core structure. The remainder of the core structure typically comprises various support paper layers, and may include one or more highly-opaque intermediate layers between the decorative and support layers so that the appearance of the support layers does not adversely impact the appearance of decorative layer.

Paper laminates may be produced by both low- and high-pressure lamination processes.

Various methods can be employed to provide paper laminates by low-pressure lamination. For example, a single opening, quick cycle press can be used where one or more resin-saturated paper sheets are laminated to a sheet of plywood, particle board, fiberboard. A "continuous laminator" can be used where one or more layers of the resin-saturated paper are pressed into a unitary structure as the layers move through continuous laminating equipment between plates, rollers or belts. Alternatively, a laminated sheet (continuous web or cut to size) may be pressed onto a particle or fiberboard, etc. and a "glue line" used to bond the laminated sheet to the board. Single or multiple opening presses may also be employed which contain several laminates.

In making paper laminates via high-pressure lamination, a plurality of sheets are impregnated with a thermosetting resin and stacked in superimposed relation, optionally with a decorative sheet placed on top. This assembly is then heat and pressure consolidated at pressures of at least about 500 psi. Generally, more than one laminate is formed at one time by inserting a plurality of sheet assemblies in a stack with each assembly being separated by a release medium which allows the individual laminates to be separated after heat and pressure consolidation.

The laminates so formed are then bonded to a substrate, such as plywood, hardboard, particle board, fiberboard, composites and the like, by the use of adhesives such as contact adhesives, urea-formaldehyde, white glues (polyvinyl acetate emulsions), hot melts, phenolic or resorcinol formaldehyde, epoxy, coal tar, animal glues and the like.

It has been found desirable during the production of such laminates, by either low- or high-pressure lamination processes, to impart abrasion-resistant characteristics to the decorative surface portion of the laminate to enhance the utility of such laminates in end-use applications such as table and countertops, wall panels and floor surfacing. Such abrasion resistance can, for example, be imparted to paper laminates by means of an applied overlay sheet that provides a barrier over the print sheet. If the print sheet is decorative, the overlay should be substantially transparent. Abrasion-resistant resin coatings have also been applied to the surface of the laminate.

It has also been found desirable to impart moisture barrier properties to the base of such paper laminates, which can be done by bonding a moisture-barrier layer to the base of the laminate.

Examples of such paper laminates may be found, for example, in USRE30233, U.S. Pat. Nos. 4,239,548, 4,599,124, 4,689,102, 5,425,986, 5,679,219, 6,287,681, 6,290,815, 6,413,618, 6,551,455, 6,706,372, 6,709,764, 6,761,979, 6,783,631 and US2003/0138600, the disclosures of which are incorporated by reference herein for all purposes as if fully set forth.

The papers in such paper laminates generally comprises a resin-impregnated, cellulose pulp-based sheet, with the pulp being based predominantly on hardwoods such as eucalyptus, sometimes in combination with minor amounts of softwood pulps. Pigments (such as titanium dioxide) and fillers are added in amounts generally up to and including about 45 wt % (based on the total dry weight prior to resin impregnation) to obtain the required opacity. Other additives such as wet-strength, retention, sizing (internal and surface) and fixing agents may also be added as required to achieve the desired end properties of the paper. Resins used to impregnate the papers include, for example, diallyl phthalates, epoxide resins, urea formaldehyde resins, urea-acrylic acid ester copolyesters, melamine formaldehyde resins, melamine phenol formaldehyde resins, phenol formaldehyde resins, poly(meth)acrylates and/or unsaturated polyester resins.

Examples of papers used in paper laminates may be found in U.S. Pat. No. 6,599,592 (the disclosure of which is incorporated by reference herein for all purposes as if fully set forth) and the above-incorporated references, including but not limited to U.S. Pat. Nos. 5,679,219, 6,706,372 and 6,783,631.

As indicated above, the paper typically comprises a number of components including, for example, various pigments, retention agents and wet-strength agents. The pigments, for example, impart desired properties such as opacity and whiteness to the final paper, and a commonly used pigment is titanium dioxide that is, in a relative sense, expensive in nature. Retention aids are added in order to minimize losses of titanium dioxide and other fine components during the papermaking process, which adds cost, as do the use of other additives such as wet-strength agents.

A need exists for treated inorganic core particles, such as treated titanium dioxide particles, that have improved dispersability and that are easier to handle in use.

SUMMARY OF THE DISCLOSURE

In a first aspect, the disclosure provides a laminate paper comprising a treated inorganic core particle, in particular a treated titanium dioxide ($TiO_2$) particle, having improved dispersability, prepared by a process comprising:

(a) heating a slurry comprising porous silica treated inorganic core particle and water at a temperature of at least about 90° C., more typically about 93 to about 97° C., still more typically about 95 to about 97° C.; and (b) adding a soluble alumina source to the slurry from step (a) while maintaining the pH at about 8.0 to 9.5 to form an alumina treatment on the porous silica treated inorganic core particle; wherein the treated inorganic core particle does not comprise dense silica or alumina treatments, and has silica present in the amount of about 7% to about 14% and alumina present in the amount of about 4.0% to about 8.0%; and wherein the particle to particle surface treatments are substantially homogeneous.

In the first aspect, the treated inorganic core particle, in particular treated titanium dioxide ($TiO_2$) particle, is completely dispersed in the water to form a slurry in less than 10 minutes.

By "homogeneous" we mean that each core particle has attached to its surface an amount of alumina and silica such that the variability in treatment levels among particles is so low as to make all particles interact with water, organic solvent or dispersant molecules in the same manner (that is, all particles interact with their chemical environment in a common manner and to a common extent).

By "completely dispersed" we mean that all agglomerates formed in the wet-treatment and/or drying processes have been reduced to individual particles or small groups of particles (aggregates) that are created during the particle formation stage in pigment manufacture.

In the first aspect, the silica is applied by deposition of pyrogenic silica onto pyrogenic inorganic core particle, in particular pyrogenic titanium dioxide ($TiO_2$) particle, or by co-oxygenation of silicon tetrachloride with titanium tetrachloride, or by deposition via condensed phase aqueous oxide precipitation onto the inorganic core particle, in particular titanium dioxide ($TiO_2$) particle as described below.

In the first aspect, the disclosure provides a process wherein the slurry comprising silica treated inorganic core particle, in particular silica treated titanium dioxide ($TiO_2$) particle, and water is prepared by a process comprising:

(a1) providing a slurry of an inorganic core particle in water;

(a2) heating the slurry to about 30 to about 40° C., more typically 33-37° C. and adjusting the pH to about 3.5 to about 7.5;

(a3) adding a soluble silicate solution to the slurry while maintaining the pH between about 3.5 and about 7.5; and (a4) stirring for at least about 5 mins.

In a second aspect, the disclosure provides a paper laminate comprising a laminate paper, wherein the laminate paper comprises a treated inorganic core particle having improved dispersability, prepared by a process comprising:

(a) heating a slurry comprising porous silica treated inorganic core particle and water at a temperature of at least about 90° C., more typically about 93 to about 97° C., still more typically about 95 to about 97° C.; and (b) adding a soluble alumina source to the slurry from step (a) while maintaining the pH at about 8.0 to 9.5 to form an alumina treatment on the porous silica treated inorganic core particle; wherein the treated inorganic core particle does not comprise dense silica or alumina treatments, and has silica present in the amount of at least about 7% up to about 14% and alumina present in the amount of about 4.0% to about 8.0%; and wherein the particle to particle surface treatments are substantially homogeneous.

In the second aspect, the disclosure provides a paper laminate further comprising Kraft paper.

DETAILED DESCRIPTION OF THE DISCLOSURE

In this disclosure "comprising" is to be interpreted as specifying the presence of the stated features, integers, steps, or components as referred to, but does not preclude the presence or addition of one or more features, integers, steps, or components, or groups thereof. Additionally, the term "comprising" is intended to include examples encompassed by the terms "consisting essentially of" and "consisting of." Similarly, the term "consisting essentially of" is intended to include examples encompassed by the term "consisting of."

In this disclosure, when an amount, concentration, or other value or parameter is given as either a range, typical range, or a list of upper typical values and lower typical values, this is to be understood as specifically disclosing all ranges formed from any pair of any upper range limit or typical value and any lower range limit or typical value, regardless of whether ranges are separately disclosed. Where a range of numerical values is recited herein, unless otherwise stated, the range is intended to include the endpoints thereof, and all integers and fractions within the range. It is not intended that the scope of the disclosure be limited to the specific values recited when defining a range.

In this disclosure, terms in the singular and the singular forms "a," "an," and "the," for example, include plural referents unless the content clearly dictates otherwise. Thus, for example, reference to "$TiO_2$ particle", "the $TiO_2$ particle", or "a $TiO_2$ particle" also includes a plurality of $TiO_2$ particles.

This disclosure relates to an inorganic core particle, typically inorganic metal oxide or mixed metal oxide pigment particles, more typically a titanium dioxide particle that may be a pigment or a nanoparticle, wherein the inorganic core particles, typically inorganic metal oxide or mixed metal oxide particles, more typically titanium dioxide particles have improved dispersability.

Inorganic Core Particle:

It is contemplated that any inorganic core particle, and in particular titanium dioxide particles are treated as per this disclosure. By inorganic core particle it is meant an inorganic particulate material that becomes dispersed throughout a final product such as a polymer melt or coating or laminate composition and imparts color and opacity to it. The inorganic core particle may be oxides of titanium, aluminum, zinc, copper, iron; the sulfates of calcium, strontium, barium; zinc sulfide; copper sulfide, zeolites; mica; talc; kaolin, mullite, calcium carbonate, or silica. Lead or mercury compound are contemplated equivalent core materials but may be undesirable due to their toxicity. More typical core materials are titanium dioxide, $TiO_2$ and barium sulfate, and most typically titanium dioxide, $TiO_2$.

In particular, titanium dioxide is an especially useful particle in the processes and products of this disclosure. Titanium dioxide ($TiO_2$) particles useful in the present disclosure may be in the rutile or anatase crystalline form. They are commonly made by either a chloride process or a sulfate process. In the chloride process, $TiCl_4$ is oxidized to $TiO_2$ particles. In the sulfate process, sulfuric acid and ore containing titanium are dissolved, and the resulting solution goes through a series of steps to yield $TiO_2$. Both the sulfate and chloride processes are described in greater detail in "The Pigment Handbook", Vol. 1, 2nd Ed., John Wiley & Sons, NY (1988), the teachings of which are incorporated herein by reference. The particle may be a pigment or nanoparticle.

By "pigment" it is meant that the titanium dioxide particles have an average size of less than 1 micron. Typically, the particles have an average size of from about 0.020 to about 0.95 microns, more typically, about 0.050 to about 0.75 microns and most typically about 0.075 to about 0.50 microns. By "nanoparticle" it is meant that the primary titanium dioxide particles typically have an average particle size diameter of less than about 100 nanometers (nm) as determined by dynamic light scattering that measures the particle size distribution of particles in liquid suspension. The particles are typically agglomerates that may range from about 3 nm to about 6000 nm.

Process for Preparing Treated Titanium Dioxide Particles

The process for preparing a treated inorganic core particle, in particular a treated titanium dioxide ($TiO_2$) particle, having improved dispersability comprises heating a slurry comprising porous silica treated inorganic core particle and water at a temperature of at least about 90° C., more typically about 93 to about 97° C., still more typically about 95 to about 97° C. The silica application is by deposition of pyrogenic silica onto pyrogenic inorganic core particle, in particular pyrogenic titanium dioxide ($TiO_2$) particle, or by co-oxygenation of silicon tetrachloride with titanium tetrachloride, or by deposition via condensed phase aqueous oxide.

In one embodiment, the slurry comprising silica treated inorganic core particle, in particular treated titanium dioxide ($TiO_2$) particle, and water is prepared by a process comprising the following steps that include providing a slurry of inorganic core particle in water; wherein typically $TiO_2$ is present in the amount of 25 to about 35% by weight, more typically about 30% by weight, based on the total weight of the slurry. This is followed by heating the slurry to about 30 to about 40° C., more typically 33-37° C., and adjusting the pH to about 3.5 to about 7.5, more typically about 5.0 to about 6.5. Soluble silicates such as sodium or potassium silicate are then added to the slurry while maintaining the pH between about 3.5 and about 7.5, more typically about 5.0 to about 6.5; followed by stirring for at least about 5 mins and typically at least about 10 minutes, but no more than 15 minutes, to facilitate precipitation onto the inorganic core particle, in particular titanium dioxide ($TiO_2$) particle. Commercially available water soluble sodium silicates with $SiO_2/Na_2O$ weight ratios from about 1.6 to about 3.75 and varying from 32 to 54% by weight of solids, with or without further dilution are the most practical. To apply a porous silica to the inorganic core particle, the slurry should typically be acidic during the addition of the effective portion of the soluble silicate. The acid used may be any acid, such as HCl, $H_2SO_4$, $HNO_3$ or $H_3PO_4$ having a dissociation constant sufficiently high to precipitate silica and used in an amount sufficient to maintain an acid condition in the slurry. Compounds such as $TiOSO_4$ or $TiCl_4$ which hydrolyze to form acid may also be used. Alternative to adding all the acid first, the soluble silicate and the acid may be added simultaneously so long as the acidity of the slurry is typically maintained at a pH of below about 7.5. After addition of the acid, the slurry should be maintained at a temperature of no greater than 50° C. for at least 30 minutes before proceeding with further additions.

The treatment corresponds to about 7 to about 14% by weight of silica, more typically about 9.5 to about 12.0%, based on the total weight of the inorganic core particle, and in particular the titanium dioxide core particle. Control of the isoelectric point between 5.0 and 7.0 can be beneficial in facilitating the dispersion and/or flocculation of the particulate compositions during plant processing and in their end use applications.

An alternate method of adding a silica treatment to the $TiO_2$ particle is by deposition of pyrogenic silica onto pyrogenic inorganic core particle, in particular pyrogenic titanium dioxide ($TiO_2$) particle, as described in U.S. Pat. No. 5,922,120, or by co-oxygenation of silicon tetrachloride with titanium tetrachloride, as described in U.S. Pat. Nos. 5,562,764, and 7,029,648 which are incorporated herein by reference.

The slurry comprising porous silica treated inorganic core particles and water is heated at a temperature of at least about 90° C., more typically about 93 to about 97° C., still more typically about 95 to about 97° C. The second treatment comprises precipitated aluminum oxide or alumina. This treatment is porous, and is typically applied from a solution of soluble alumina source, such as a soluble aluminate, using techniques known to one skilled in the art. In a specific embodiment, a soluble alumina source, such as a soluble aluminate, is added to the slurry comprising silica treated titanium dioxide while maintaining the pH at about 7.0 to 10.0, more typically 8.5 to about 9.5 to form an alumina treatment on the porous silica treated inorganic core particle. By "soluble alumina source" is meant alkali metal salts of aluminate anions, for example, sodium or potassium aluminate. Alternatively, the soluble alumina source may be acidic, such as for example aluminum chloride, in which case the pH is controlled using a base rather than an acid. The treated inorganic core particle does not comprise dense silica or alumina treatments.

The porous alumina treatment is present in the amount of about 4.0% to about 8.0%; more typically about 5.0% to about 7.5%, based on the total weight of the inorganic core particle, and in particular the titanium dioxide core particle. Because substantially all of the alumina that is precipitated finds its way to a treatment on the inorganic core particles, it typically is only necessary to provide that amount of soluble alumina source, such as a soluble aluminate, to the slurry liquid which will result, after precipitation, in the appropriate degree of treatment.

Typically, the particle to particle surface treatments are substantially homogenous. By this we mean that each core particle has attached to its surface an amount of alumina and silica such that the variability in alumina and silica levels among particles is so low as to make all particles interact with water, organic solvent or dispersant molecules in the same manner (that is, all particles interact with their chemical environment in a common manner and to a common extent). Typically, the treated inorganic core particle, in particular treated titanium dioxide ($TiO_2$) particle, is completely dispersed in the water to form a slurry in less than 10 minutes, more typically less than about 5 minutes. By "completely dispersed" we mean that the dispersion is composed of individual particles or small groups of particles created during the particle formation stage (hard aggregates) and that all soft agglomerates have been reduced to individual particles.

After treatment according to this process the pigment is recovered by known procedures including neutralization of the slurry if necessary, filtration, washing, drying and frequently a dry grinding step such as micronizing. Drying is not necessary, however, as a thick slurry of the product can be used directly in preparing emulsion paints where water is the liquid phase. The process provides a method for easily and efficiently obtaining a high solids water slurry of completely dispersed particles.

While the disclosure is not intended to be bound by a theory of operation, it is believed that the improved dispersability of the porous treated $TiO_2$ pigments of the disclosure is due to the nature of the treatments and application thereof.

Applications

The treated inorganic core particles, typically inorganic metal oxide or mixed metal oxide particles, more typically titanium dioxide, may be used in coating compositions such as paints and inks, plastic parts such as shaped articles or films, or paper laminates. The paper laminates of this disclosure are useful as flooring, furniture, countertops, artificial wood surface, and artificial stone surface.

Laminate Paper

The treated inorganic core particle, in particular the treated titanium dioxide particle can be used to prepare laminate paper in any of the customary ways, wherein at least a portion of the titanium dioxide pigment typically used in such papermaking is replaced with the treated inorganic core particle, in particular the treated titanium dioxide pigment.

As indicated above, the laminate paper in accordance with the present invention is an opaque, cellulose pulp-based sheet containing a titanium dioxide pigment component in an amount of about 45 wt % or less, more typically from about 10 wt % to about 45 wt %, and still more typically from about 25 wt % to about 42 wt %, wherein the titanium dioxide pigment component comprises the treated inorganic core particle, in particular the treated titanium dioxide particle of this disclosure. In one typical embodiment, the titanium dioxide pigment component comprises at least about 25 wt %, and more typically at least about 50 wt % (based on the weight of the titanium dioxide pigment component) of the treated titanium dioxide pigment of this disclosure. In another typical embodiment, the titanium dioxide pigment component consists essentially of the treated titanium dioxide pigment of this disclosure, in yet another typical embodiment, the titanium dioxide pigment component comprises substantially only the treated titanium dioxide pigment of this disclosure.

For paper laminate applications, the laminate paper should typically be of uniform weight so that the finished product will have a substantially even thickness. The laminate paper must also be properly porous and absorbent so it will carry just the right amount of impregnating resin.

For a decorative laminate paper, the paper should be substantially white so as to not impart any undesired coloration to the final decorative pattern.

The decorative laminate paper can also be printed by various well-known analog and digital printing methods to impart desired coloration and designs as required for the particular end use. Analog printing methods such as screen printing are particularly suitable for large runs and consistent patterns. Digital printing methods such as inkjet printing are particularly suitable for short runs and customized patterning.

These and other considerations and parameters involved in the composition, production and decoration of laminate paper are well known to those of ordinary skill in the art as evidenced by many of the previously incorporated references.

Paper Laminates

Paper laminates in accordance with the present invention can be made by any of the conventional processes well known to those of ordinary skill in the relevant art, as described in many of the previously incorporated references.

Typically, the process of making paper laminates begins with raw materials—impregnating resins such as phenolic and melamine resins, brown paper (such as Kraft paper) and high-grade print paper (a laminate paper in accordance with the present disclosure).

The brown paper serves as a carrier for the impregnating resins, and lends reinforcing strength and thickness to the finished laminate. The high-grade paper is the decorative sheet, for example, a solid color, a printed pattern or a printed wood grain.

In an industrial-scale process, rolls of paper are typically loaded on a spindle at the "wet end" of a resin treater for impregnation with a resin. The high-grade (decorative) surface papers are treated with a clear resin, such melamine resin, so as to not affect the surface (decorative) appearance of the paper. Since appearance is not critical for the brown paper, it may be treated with a colored resin such as phenolic resin.

Two methods are commonly used to impregnate the paper with resin. The usual way (and the fastest and most efficient) is called "reverse-roll coating." In this process, the paper is drawn between two big rollers, one of which applies a thin coating of resin to one side of the paper. This thin coating is given time to soak through the paper as it passes through to a drying oven. Almost all of the brown paper is treated by the reverse-roll process, because it is more efficient and permits full coating with less resin and waste.

Another way is a "dip and squeeze" process, in which the paper is drawn through a vat of resin, then passed through rollers that squeeze off excess resin. The surface (decorative) papers are usually resin impregnated by the dip-and-squeeze process because, although slower, it permits a heavier coating of the impregnating resin for improves surface properties in the final laminate, such as durability and resistance to stains and heat.

After being impregnated with resin, the paper (as a continuous sheet) is passed through a drying (treater) ovens to the "dry end," where it is cut into sheets.

The resin-impregnated paper should be consistent to avoid unevenness in the finished laminate.

In the assembly of the laminate components, the top is generally the surface paper since what the finished laminate looks like depends mainly on the surface paper. A topmost "overlay" sheet that is substantially transparent when cured may, however, be placed over the decorative sheet, for example, to give depth and wear resistance to the finished laminate.

In a laminate where the surface paper has light-hued solid colors, an extra sheet of fine, white paper may be placed beneath the printed surface sheet to prevent the amber-colored phenolic filler sheet from interfering with the lighter surface color.

The texture of the laminate surface is determined by textured paper and/or a plate that is inserted with the buildup into the press. Typically, steel plates are used, with a highly polished plate producing a glossy finish, and an etched textured plate producing a matte finish.

The finished buildups are sent to a press, with each buildup (a pair of laminates) is separated from the next by the above-mentioned steel plate. In the press, pressure is applied to the buildups by hydraulic rams or the like. Typically, at least 800 psi, and sometimes as much as 1,500 psi pressure is applied, while the temperature is raised to more than 250° F. by passing superheated water or steam through jacketing built into the press. The buildup is maintained under these temperature and pressure conditions for a time (typically about one hour) required for the resins in the resin-impregnated papers to re-liquefy, flow and cure, bonding the stack together into a single sheet of finished, decorative laminate.

Once removed from the press, the laminate sheets are separated and trimmed to the desired finished size. Typically the reverse side of the laminate is also roughened (such as by sanding) to provide a good adhesive surface for bending to one or more substrates such as plywood, hardboard, particle board, composites and the like. The need for and choice of substrate and adhesive will depend en the desired end use of the laminate, as will be recognized by one of ordinary skill in the relevant art.

The examples which follow, description of illustrative and typical embodiments of the present disclosure are not intended to limit the scope of the disclosure. Various modifications, alternative constructions and equivalents may be employed without departing from the true spirit and scope of the appended claims. In one embodiment, the coating films may be substantially free of other conventional colorants and contain solely the treated titanium dioxide pigments of this disclosure.

EXAMPLES

Example 1

2000 g of $TiO_2$ oxidation base is slurried in 4520 ml deionized water to provide a concentration of 400 g $TiO_2$/liter (30.7 wt % $TiO_2$). This slurry is heated to 35° C. and the pH was adjusted to 5.5. Sodium silicate solution (1210 grams) is added with enough HCl to maintain pH between 4 and 7. After curing (with mixing) for 5 minutes, the slurry is heated to 55° C. 695 grams of sodium aluminate is added with enough HCl to maintain pH at 7. The slurry is stirred for an additional 30 minutes, maintaining pH and temperature, then filtered, washed, dried and steam micronized. The resulting sample has a percent $SiO_2$ value of 14% and a percent alumina value of 7.6%.

Example 2

The procedure described in Example 1 is used except:
After the 5 minute silica cure, the slurry is heated to 95° C.
During and after the aluminate addition, the slurry pH is maintained at 9.0.

About 2 grams of pigment from Examples 1 and 2 are dispersed into deionized water at a concentration of about 1.0 weight percent using a standard laboratory blender. This suspension is added to a mixture of about 1.8 grams of refined eucalyptus pulp dispersed in about 350 grams of water, and the pH of this mixture is adjusted to about 7.5. The resulting mixture is stirred using magnetic stirring for about one minute and then poured into a standard laboratory handsheet former. The suspension is drained through the handsheet former to yield a wet handsheet consisting of pulp and titanium dioxide. This handsheet is then pressed and dried using standard methods. The basis weight of the dried handsheet is determined by measuring the weight of a known area (measured in square meters) of the handsheet. The concentration of titanium dioxide present in the handsheet is subsequently determined using a standard ash measurement. In this measurement, a known weight of the handsheet is ignited and burned in an oxygen-enriched laboratory vessel. This causes removal of essentially all of the pulp. The remaining ash product is assumed to consist entirely of titanium dioxide. It is expected that the paper made with pigment as described in Example 2 will retain more and better spaced $TiO_2$ pigment and therefore have higher opacity than the paper made with pigment as described in Example 1 when the pigments are added at equal levels.

What is claimed is:

1. A laminate paper comprising a treated inorganic core particle having improved dispersability, prepared by a process comprising:
    (a) heating a slurry comprising porous silica treated inorganic core particle and water at a temperature of at least about 90° C.; and
    (b) adding a soluble alumina source to the slurry from step (a) while maintaining the pH at about 8.0 to 9.5 to form an alumina treatment on the porous silica treated inorganic core particle; wherein the treated inorganic core particle does not comprise dense silica or alumina treatments, and has silica present in the amount of at about 7% to about 14% and alumina present in the amount of about 4.0% to about 8.0% based on the total weight of the inorganic core particle; and wherein the particle to particle surface treatments are substantially homogeneous.

2. The laminate paper of claim 1 further comprising an opaque, cellulose pulp-based sheet.

3. The laminate paper of claim 1 further comprising an impregnating resin.

4. The laminate paper of claim 3 wherein the impregnating resin is a phenolic resin or a melamine resin.

5. The laminate paper of claim 1 wherein the inorganic core particle is an oxide of titanium, aluminum, zinc, copper or iron; a sulfate of calcium, strontium or barium; zinc sulfide; copper sulfide, zeolite; mica; talc; kaolin, mullite, calcium carbonate, or silica.

6. The laminate paper of claim 5 wherein the inorganic core particle is titanium dioxide, $TiO_2$ or barium sulfate.

7. The laminate paper of claim 6 wherein the inorganic core particle is titanium dioxide, $TiO_2$.

8. The laminate paper of claim 1 wherein the slurry in step (a) is heated to a temperature of about 93 to about 97° C.

9. The laminate paper of claim 1 wherein the soluble alumina source is an alkali metal salt of an aluminate anion.

10. The laminate paper of claim 9 wherein the soluble alumina source is sodium aluminate or potassium aluminate.

11. The laminate paper of claim 1 wherein the treated inorganic core particle is completely dispersed in water to form a slurry in less than 10 minutes.

12. The laminate paper of claim 1 wherein the silica in the porous silica treated inorganic core particle is applied by deposition of pyrogenic silica onto pyrogenic inorganic core particle, by co-oxygenation of silicon tetrachloride with titanium tetrachloride, or by deposition via condensed phase aqueous oxide precipitation onto the inorganic core particle.

13. The laminate paper of claim 12 wherein the slurry comprising porous silica treated inorganic core particle and water is prepared by a process comprising:
    (a1) providing a slurry of inorganic core particle in water;
    (a2) heating the slurry to about 30 to about 40° C. and adjusting the pH to about 3.5 to about 7.5;
    (a3) adding a soluble silicate solution to the slurry while maintaining the pH between about 3.5 and about 7.5; and
    (a4) stirring for at least about 5 mins.

14. The laminate paper of claim 13 wherein the slurry is heated to a temperature of about 33 to about 37° C.

15. The laminate paper of claim 14 wherein the soluble silicate is sodium silicate or potassium silicate.

16. A paper laminate comprising a laminate paper, wherein the laminate paper comprises a treated inorganic core particle having improved dispersability, prepared by a process comprising:
    (a) heating a slurry comprising porous silica treated inorganic core particle and water at a temperature of at least about 90° C.; and
    (b) adding a soluble alumina source to the slurry from step (a) while maintaining the pH at about 8.0 to 9.5 to form an alumina treatment on the porous silica treated inorganic core particle; wherein the treated inorganic core particle does not comprise dense silica or alumina treatments, and has silica present in the amount of about 7% to about 14% and alumina present in the amount of about 4.0% to about 8.0%; and wherein the particle to particle surface treatments are substantially homogeneous.

17. The paper laminate of claim 16 further comprising Kraft paper.

\* \* \* \* \*